United States Patent [19]

Bookout

[11] Patent Number: 4,487,299
[45] Date of Patent: Dec. 11, 1984

[54] PROTECTION APPARATUS FOR LIQUID-FILLED SUBMERGIBLE MOTORS AND THE LIKE

[75] Inventor: Russell J. Bookout, Bartlesville, Okla.

[73] Assignee: TRW Inc., Cleveland, Ohio

[21] Appl. No.: 356,406

[22] Filed: Mar. 9, 1982

[51] Int. Cl.³ ............................................. F04B 21/02
[52] U.S. Cl. ..................................... 188/313; 310/87
[58] Field of Search ...................... 91/1; 188/266, 297, 188/311, 313, 317, 378; 267/124, 126; 310/87; 417/424, 428

[56] References Cited

U.S. PATENT DOCUMENTS

| | | |
|---|---|---|
| 2,539,048 | 1/1951 | Arutunoff . |
| 2,674,702 | 4/1954 | Arutunoff . |
| 2,783,400 | 2/1957 | Arutunoff . |
| 2,854,595 | 9/1958 | Arutunoff . |
| 2,862,122 | 11/1958 | Courtin et al. . |
| 2,922,055 | 1/1960 | Deters . |
| 3,072,810 | 1/1963 | Luenberger . |
| 3,091,307 | 5/1963 | Tiedemann et al. ................. 188/378 |
| 3,198,083 | 8/1965 | Farr et al. .................................. 91/1 |
| 3,270,224 | 8/1966 | Turk . |
| 3,369,137 | 2/1968 | Sanger . |
| 3,475,634 | 10/1969 | Bogdanov et al. . |
| 3,571,636 | 3/1971 | Carle et al. . |
| 3,581,774 | 6/1971 | Oeland, Jr. . |
| 3,785,753 | 1/1974 | Bognanov et al. . |
| 4,040,773 | 8/1977 | Tuzson . |

Primary Examiner—Duane A. Reger
Attorney, Agent, or Firm—Shapiro and Shapiro

[57] ABSTRACT

This disclosure pertains to protection apparatus for liquid-filled submergible equipment such as downhole electric motors used in oil wells and the like. The protection apparatus provides a positive bias force on the filling liquid so that any liquid leakage through motor seals and the like takes place from the inside out. The positive bias pressure is created by a piston having a substantially constant biasing pressure applied thereto by constant force springs. The piston operates in a cylinder which communicates at its head-end with the equipment being protected. The base-end of the cylinder communicates with a conventional labyrinth-type protector for maintaining an interface between the protecting liquid and well fluid externally of the cylinder.

18 Claims, 7 Drawing Figures

FIG. 1.
FIG. 2.
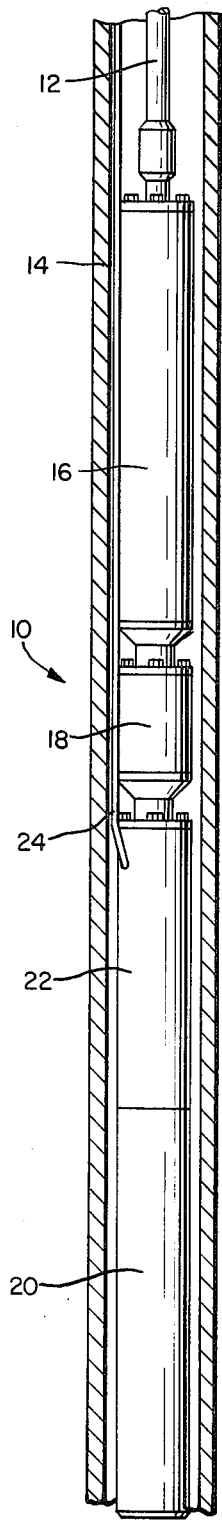
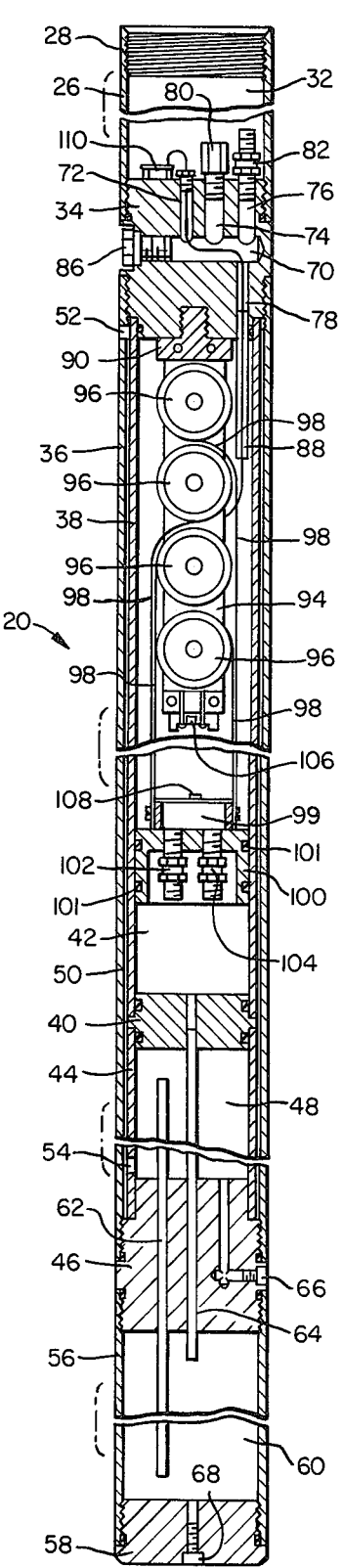

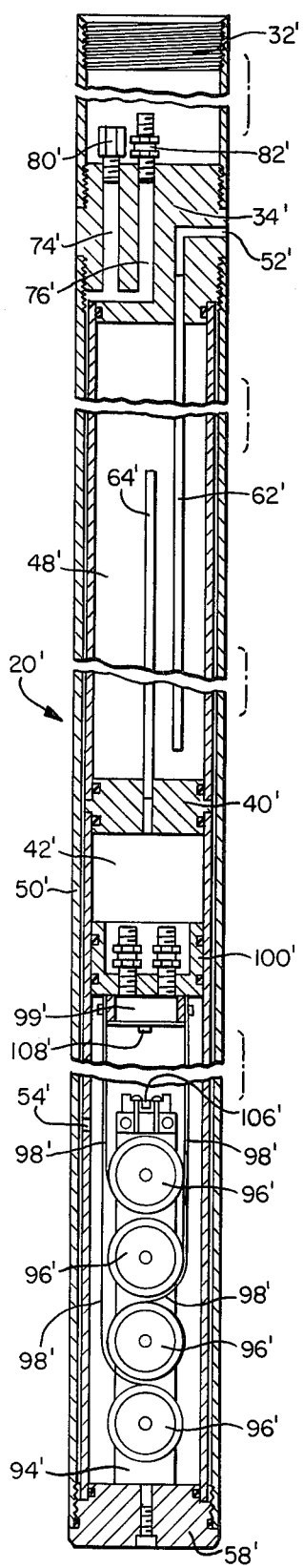
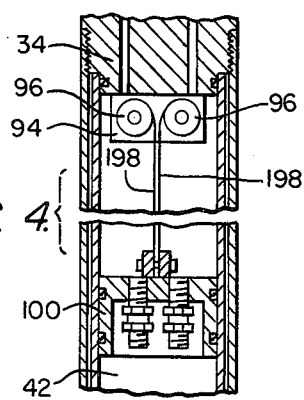
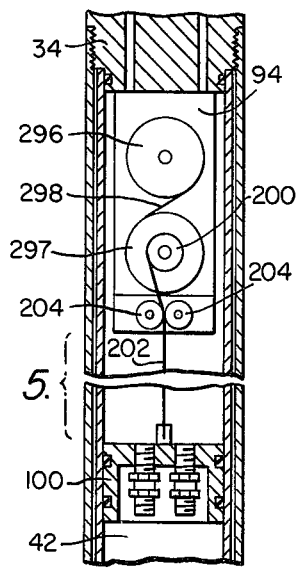
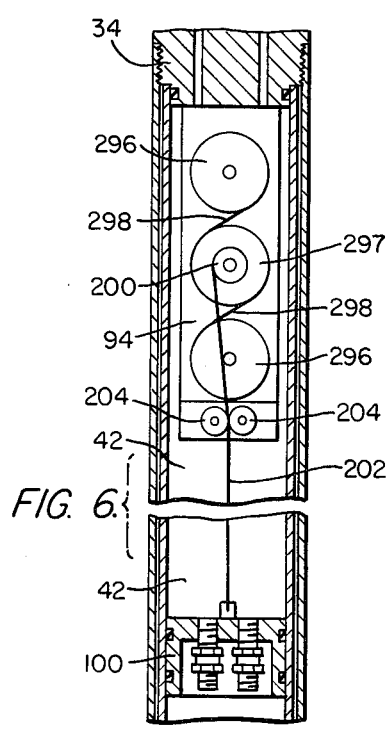
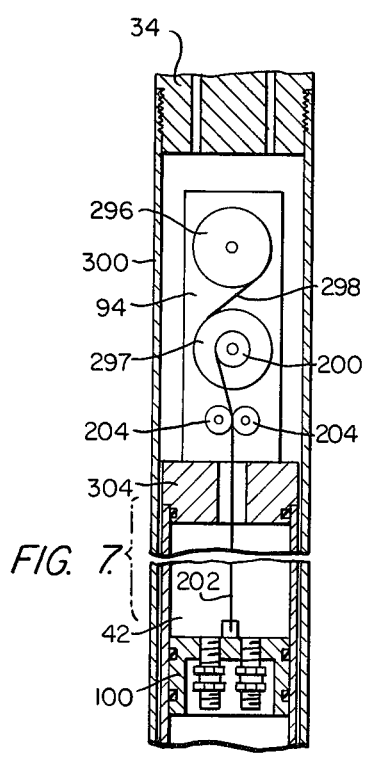

PROTECTION APPARATUS FOR LIQUID-FILLED SUBMERGIBLE MOTORS AND THE LIKE

BACKGROUND OF THE INVENTION

This invention relates to protection apparatus for liquid-filled submergible equipment, such as electric motors, which may be used, for example, in oil and other wells for driving downhole pumps.

It is desirable to protect submergible motors and the like against the ingress of possibly harmful fluids in which the motors may be immersed, for example corrosive well fluids. Accordingly, it is common practice to fill such motors with a benign liquid, such as a suitable lubricating oil, and to use a motor protector to isolate the motor interior from its surrounding environment and accommodate changes in volume of the motor liquid, which might otherwise lead to external fluid being drawn into the motor.

Different types of protectors have previously been used with downhole submergible motor-pump assemblies. A first type, for example, has open communication with the external well fluid and utilizes a labyrinth path, which takes advantage of the natural gravity separation between the well fluid and the internal motor liquid, to minimize mixing of these. A second known protector is of the positive seal type, which uses a flexible diaphragm, bellows, or other pressure communicating barrier system to provide an interface between the motor liquid and the well fluid. A third known type of protector is similar to the first type, but has a chamber filled with an inert barrier fluid having a higher specific gravity than both the well fluid and the motor liquid. This type of protector relies on the high specific gravity of the inert fluid to prohibit interchange between the well fluid and the motor liquid. Examples of known motor protectors may be found in U.S. Pat. Nos. 2,674,702; 2,783,400; and 2,854,595.

While known protectors have proven to be servicable and reliable for most submergible motor applications, they have certain weaknesses, generally arising from harsh well environments, to which the known devices are not well suited. Also, when a well's direction deviates from the vertical, gravity separation of the well fluid and motor liquid is less effective, and may be greatly diminished for deviations greater than 45 degrees. Positive seal protectors inherently create a pressure differential between the well fluid and the motor liquid. This pressure differential, if negative (for example, motor liquid at a lower static pressure than the well fluid) can lead to contamination of the internal system due to leaks at locations such as joints, cable entry ports, shaft seals and the like.

Additionally, prior protectors provide no means for enunciating a state of potential contamination failure, or other deleterious effects before such effects produce undesirable consequences in the protected equipment.

SUMMARY OF THE INVENTION

The invention provides protection apparatus for submergible liquid-filled equipment, such as a downhole motor and the like, the apparatus being adapted to produce a positive internal bias pressure on the filling liquid, so that the liquid may be maintained at a higher pressure than the surrounding environment, whereby any leakage of liquid will be out of, rather than into, the protected equipment. Apart from ensuring that possibly harmful fluid from the exterior of the equipment will not leak in through seals or the like, controlled leakage in the output direction of clean liquid also has the beneficial effect of washing contaminants from seals and the like.

In a preferred form of protection apparatus in accordance with the invention, positive pressure may be applied to the filling liquid by means of a piston operating in a liquid-filled cylinder having a head-end that communicates with the interior of the equipment to be protected. A biasing force, preferably a substantially constant biasing force, may be applied to the piston by biasing means such as a constant-force or constant-torque spring arrangement suitably housed within the cylinder or in a compartment adjacent thereto. Thus, a substantially constant bias-pressure may be maintained on the filling liquid, the value of which is dependent, inter alia, on the spring force and piston friction, and expansion and contraction of the filling liquid is accommodated by movements of the piston within the cylinder.

In order to avoid contamination of the liquid-filled cylinder over extended periods of operation, by infiltration of possibly harmful external fluids, the base of the liquid-filled cylinder may communicate with a conventional form of motor protector, for example, a gravity-type labyrinth protector, whereby the interface between the clean filling liquid and the exterior fluid can be maintained externally of the cylinder.

Additionally, valve means may be provided in the piston to permit transfer of liquid between the high and low pressure sides of the piston under particular operating conditions as will be described, more particularly for prolonging the effective life cycle of the protection apparatus beyond a full stroke of the piston.

In accordance with a further aspect of the invention, means responsive to the position of the piston in the cylinder may be provided for generating a signal to permit remote monitoring of the condition of the apparatus.

Additional features of the invention will be apparent from the ensuing description and claims taken in conjunction with the accompanying drawings.

BRIEF DESCRIPTION OF DRAWINGS

FIG. 1 is a side elevational view of a downhole pumping installation;

FIG. 2 is a sectional elevation of protection apparatus in accordance with the invention for use in the FIG. 1 installation;

FIG. 3 is a sectional elevation of an alternative form of protection apparatus in accordance with the invention; and FIGS. 4–7 are sectional elevations of modified forms of piston biasing arrangements for use in the protection apparatus.

DESCRIPTION OF PREFERRED EMBODIMENTS

A downhole pumping installation 10, as shown in FIG. 1, is suspended by tubing 12 or other means in a well casing 14. The installation may, for example, include a suitable submergible pump 16, such as a well-known centrifugal type of downhole pump, a shaft seal and thrust bearing assembly 18, a liquid-filled electric motor 22 for driving the pump (the motor again may be of any suitable type known for this application and may be energized by a cable 24) and protection apparatus 20 in accordance with the invention, for maintaining a positive bias pressure on the motor-filling liquid and preventing the ingress of well fluid. In use, with the installation submerged in well fluid, the motor-driven pump may draw in the fluid through an inlet, not shown, and discharge the fluid into tubing 12.

It will be understood that the installation shown in FIG. 1 is merely an illustrative example of equipment with which protection apparatus 20 may be used, and the protection apparatus may also be applied to other forms of submerged well equipment and other equipment requiring similar protection against ingress of external fluid.

Protection apparatus 20 is shown in detail in FIG. 2. At its upper end, the apparatus includes a cylindrical housing 26 which may be screw-threaded at 28 for attachment to the base of motor 22, housing 26 defining an upper chamber 32 adapted to communicate with the interior of the motor.

The base of housing 26 is threaded onto an upper bulkhead member 34, to the bottom of which are attached an outer cylindrical housing 36 and an inner cylindrical housing 38. Housing 38 is secured at its base to a divider 40 so as to define an internal cylinder 42. Divider 40 carries a depending cylindrical housing member 44 attached at its base to a lower bulkhead member 46, to which the outer cylindrical housing 36 is also attached. An upper labyrinth chamber 48 is formed between divider 40 and bulkhead member 46. An annular space 50 is formed between the outer cylindrical housing 36 and members 38 and 44.

Space 50 communicates with the exterior of the apparatus via a port 52 in housing 36, and the space communicates with the base of chamber 48 via a port 54 in member 44. Lower bulkhead member 46 carries a depending cylindrical housing 56 attached at its lower end to a base member 58 and defining a lower labyrinth chamber 60. The upper end of chamber 48 communicates with the lower end of chamber 60 via a first tube 62 passing through bulkhead member 46, and the upper end of chamber 60 communicates with the base of cylinder 42 via a second tube 64 passing through bulkhead member 46 and divider 40. Vent plugs 66 and 68 for the labyrinth chambers are provided in bulkhead member 46 and base member 58.

Upper bulkhead member 34 is formed with a manifold which includes a transverse passage 70, branch passages 72, 74, 76 communicating with chamber 32 and a branch passage 78 communicating with the cylinder 42 via a tube 88. Branch passage 74 is fitted with a one-way check valve 80 for allowing liquid to flow from cylinder 42 into chamber 32, and branch passage 76 is fitted with a one-way relief valve 82 for allowing liquid to flow from chamber 32 into cylinder 42. Passage 70 has a drain and fill valve 86. Tube 88 provides passage for liquid between chamber 32 and cylinder 42 and also serves to trap gas at the head-end (top) of cylinder 42.

Threaded centrally into the base of bulkhead member 34 is a flanged plug 90. The plug flange has opposed flats to which are secured a pair of spaced depending spool-support plates 94, only one of which is shown in FIG. 2. Journaled between plates 94, on suitable pins or the like, are a series of rotary spring spools 96 (four spools are illustrated). Each spool 96 carries a coiled constant-force spring 98, which may be of the well-known "Negator" type. One end of each spring is secured to the respective spool, and the other end, the free end, is attached to a fitting 99 on the crown of a cup-shaped piston 100 adapted to reciprocate vertically in housing 38 under the influence of springs 98 and liquid pressure fluctuations, as will be described. The length of springs 98 preferably is sufficient to allow the piston to move down to the base of cylinder 42 adjacent divider 40, against the spring force, and the spring arrangement is such that the springs define biasing means which impose an upward biasing force on the piston that is constant throughout the piston stroke, with the springs tending to coil themselves onto the respective spools. At the upper termination of its stroke, piston 100 is at the head-end of cylinder 42 adjacent the lower end of plates 94.

Piston 100 has a one-way check valve 102 for allowing liquid to flow upwardly through the piston and a one-way relief valve 104 for allowing downward liquid flow through the piston in a manner to be described.

A limit switch 106 may be provided at the base of plate 94 adapted to be actuated by a switch actuator 108 carried on the head of piston fitting 99, so as to actuate limit switch 106 when the piston attains the upper termination of its stroke. Circuitry for switch 106 may, for example, extend from control box 110 on bulkhead member 34 through passage 72 and tube 88. The circuitry may be extended to the surface so that when switch 106 is actuated by the piston attaining its uppermost position, the generated electrical signal may be received at the surface.

The force exerted on piston 100 by the constant force springs 98 is the principal source of the desired internal-/external pressure differential which maintains a constant bias pressure on the motor-filling liquid. The difference between the force exerted on the piston by the springs and the friction force of the piston seals 101 in housing 38 determines the force available to increase the internal pressure, and the cracking pressure of bulkhead check valve 80 then determines the minimum internal/external pressure differential which will be maintained by the piston until it comes to rest at the upper end of its stroke. For a piston of 2.875 inches diameter, for example, the springs may be designed to exert about a 7 lb. pull on the piston which causes the piston to increase the internal pressure by about 4 psi, with the cracking pressure of bulkhead check valve 80 being about 2 psi. These figures are given by way of example only and they may be altered and selected to suit the particular application for which the protection apparatus is designed.

While pump installation 10 is being lowered into a well, the weight of the internal liquid column above protection apparatus 20 is supported by the bulkhead check and relief valves 80 and 82. The cracking pressure of the bulkhead relief valve 82 should preferably, therefore, be high enough to ensure that no liquid leaves the system while the installation is lowered into a well. For a piston arrangement as described above, the cracking pressure of valve 82 may be about 20 psi. The cracking pressures of piston valves 102, 104 may be about 2 psi and 12 psi respectively.

Initially, prior to installation in a well, the entire protector apparatus, including cylinder 42, chambers 48 and 50, as well as annular space 50, is filled with protecting liquid so that piston 100 is at the lower end of its stroke adjacent divider 40.

As the pumping equipment is heated due, for example, to being lowered into hot well fluid, or due to operation of the pump and motor, the internal pressure will rise due to thermal expansion of the filling liquid, until the pressure is sufficient to crack bulkhead relief valve 82 and piston relief valve 102. Liquid will, therefore, flow through the labyrinth protector and be discharged through port 52. Also, if the well fluid has a higher specific gravity than the protector liquid, the well fluid will displace protector liquid in annular space 50, through port 52, and reach the base of chamber 48. The well fluid will not rise higher than the base of chamber 48, since for this to occur, the lighter protector liquid above the base, would have to flow downwardly through the well fluid.

If any lighter fluid is carried into the apparatus with the heavy well fluid, it will tend to separate and collect at the top of chamber 48. If there is a sufficient volume of the lighter fluid for some to be forced into chamber 60 through the tube 62, it will accumulate at the top of chamber 60 above the end of tube 64.

As the system cools, or loses fluid through seals, piston 100 will move up to supply make-up liquid. This results in more well fluid being drawn into chamber 48 and more protector liquid being supplied to cylinder 42 through tube 64. Conversely, if the system should heat up during operation, expansion of the motor-filling liquid may cause the piston to move down, and if the piston regains its lowermost position, further expansion of the liquid may again result in transfer of liquid to the labyrinth chambers through piston relief valve 104 and tube 64.

When the piston has reached the upper end of its stroke, the positive bias pressure effect on the motor-filling liquid is terminated. The labyrinth protector, however, continues to operate as previously and, dependent on the size of chambers 48 and 60, protector liquid will continue to be drawn into the motor through piston valve 102 to compensate for leakage.

The condition of the protector apparatus may be monitored from the surface by sensing the position of piston 100. For example, limit switch 106 may be operated when the piston reaches the upper end of its stroke, in order to generate a signal indicative of this occurrence. Alternatively, the position of the piston may be continuously monitored, for example, by using a multiple-turn potentiometer in conjunction with one of the spools 96, in a manner producing a continuous resistance change as the spool turns. The potentiometer signals may be relayed to the surface by any suitable means.

In the protection apparatus shown in FIG. 2, piston 100 is urged upwardly by springs 98 to apply a positive biasing pressure to the motor-filling liquid. An alternative arrangement is shown in FIG. 3, wherein the piston is urged downwardly to provide a positive biasing pressure. Like reference numerals (primed in FIG. 3) are used in the respective figures to denote like parts.

In the FIG. 3 arrangement, only a single labyrinth chamber 48' is used, the chamber again being located between the piston 100' and the well fluid. Chamber 48', however, is positioned above cylinder 42', and piston 100' is urged downwardly by springs 98'. It will be noted that in this arrangement, inlet 52' for well fluid, communicates directly with chamber 48' through tube 62'. A dual labyrinth chamber arrangement, similar to that of FIG. 2 may, however, also be used.

The hollow, cup-like interior of piston 100' in the downstroke apparatus serves as a means to isolate the wall of cylinder 42' and the piston seals from any small amount of heavy well fluid which may be drawn into cylinder 42' by the protector liquid as it is drawn into the upper portion of the cylinder when the piston moves down. It will be seen that a liquid flow path is established between cylinder 42' and upper chamber 32' (connected to the apparatus being protected) by a port 54', annular space 50', and conduits 74', 76' in upper bulkhead member 34'. As an alternative to annular space 50', a tube may be provided to connect port 54' and conduits 74' and 76'. Upper bulkhead check and relief valves 80' and 82' are again provided as in the previous embodiment. The volume of labyrinth chamber 48' should preferably be such that the level of well fluid drawn into the chamber will not reach the top of tube 64' during the initial full stroke of the piston.

It will be appreciated that the arrangement shown in FIG. 3 operates in like manner to the previously described embodiment, except that the piston moves downwardly toward the bottom of cylinder 42' (the bottom in this case constituting the head-end of the cylinder) in order to supply make-up liquid to the equipment being protected. The apparatus may again be provided with means for monitoring the position of the piston.

Alternatives to the spring arrangements used in FIGS. 2 and 3 are illustrated in FIGS. 4 to 7. Thus, FIG. 4 shows a back-to-back arrangement of constant force springs 198 which provides stability inherent in a back-to-back configuration and which can be used if available space permits. An advantage of this arrangement is that fewer parts are used and there is less sensitivity to unequal pull from the springs.

In the spring arrangements shown in FIGS. 5–7, constant torque springs are used in each case to supply a rotary force to a cable-carrying reel, and the free end of the cable is attached to the piston.

In FIG. 5, spring 298 is wound between spools 296, 297, to one of which is attached the cable reel 200 and cable 202. Cable guides 204 center the cable to avoid creating a tilting force on the piston. In operation, the spring tends to coil onto one of the spools in a manner tending to rotate the cable reel and provide a constant biasing force on the piston.

FIG. 6 shows an arrangement in which two springs 298 share a common output spool 297. The arrangement is also suitable for four springs if another output spool is associated with cable reel 200.

When the need for a greater force on the piston dictates the use of a spring assembly which is larger than will fit in the bore of cylinder 42, an arrangement of the type shown in FIG. 7 may be used. Here, the spring assembly is housed in a larger diameter tube 300 separated from cylinder 42 by a bulkhead member 304. Cable 202 (or the springs themselves if an arrangement similar to that shown in FIG. 2 is used) may pass through the bulkhead member for attachment to piston 100.

The spring arrangement in each case may preferably be such as to minimize any tendency for the piston to twist as it moves under the force of the springs. Suitable arrangements for minimizing this tendency by tending to equalize the forces generated by the left and right-hand springs are shown for example in FIGS. 2 and 3.

It will be seen from the foregoing that the protection apparatus in accordance with the invention provides a positive bias pressure on liquid in the equipment being protected, which pressure is selectable to maintain the static ambient pressure of the internal liquid system a controlled amount in excess of the exterior pressure.

Accordingly, any leakage will be from the inside out in order to prevent contamination of the system.

Further, the resultant controlled leakage from the system minimizes deterioration of the system seals, through a washing action. Additionally, the apparatus may contain a significant reservoir of make-up liquid (in the labyrinth protector chambers) to ensure a clean internal system over an extended time frame.

While only preferred embodiments of the invention have been described herein in detail, the invention is not limited thereby and modifications may be made within the scope of the attached claims. For example, the labyrinth-type protector part of the apparatus as described may be replaced by other known forms of protector apparatus. Additionally, the apparatus may employ a pair of pistons that may, for example, be biased in opposite directions toward a central liquid outlet.

I claim:

1. Protection apparatus for preventing the ingress of external fluid into a submergible equipment housing containing protecting liquid, comprising means for maintaining the protecting liquid in said housing under positive pressure relative to that of said external fluid and protector means for establishing an interface between said protecting liquid and said external fluid, said pressure maintaining means including a cylinder for containing further protecting liquid, the cylinder having a head-end and a base-end, a piston in said cylinder, means for biasing said piston toward said head-end and means for interconnecting said head-end with said housing to permit the flow of protecting liquid therebetween, said protector means including a chamber for containing additional protecting liquid, means for providing communication between said chamber and said base-end and means for providing communication between said chamber and said external fluid.

2. Protection apparatus as defined in claim 1, including valve means in the piston for permitting selected flow of liquid through the piston between the respective ends of the cylinder.

3. Protection apparatus as defined in claim 2, wherein the valve means includes a one-way relief valve for allowing liquid to flow through the piston in the direction of the base-end of the cylinder only when the pressure of the liquid exceeds the force exerted thereon by the piston.

4. Protection apparatus as defined in claim 2 or claim 3, wherein the valve means includes a one-way check valve for allowing liquid to flow through the piston in the direction of the head-end of the cylinder when liquid pressure at the base-end exceeds liquid pressure at the head-end.

5. Protection apparatus as defined in claim 1, wherein the interconnecting means includes a valve arrangement between the housing and the head-end.

6. Protection apparatus as defined in claim 5, wherein the valve arrangement includes a one-way check valve for providing flow of liquid from the cylinder to the housing and a one-way relief valve for providing flow of liquid from the housing to the cylinder.

7. Protection apparatus as defined in claim 1 wherein the protector means comprises a labyrinth-type protector.

8. Protection apparatus as defined in claim 7, wherein the housing, the cylinder, and the protector means are arranged in vertical alignment.

9. Protection apparatus as defined in claim 8, wherein the cylinder is located between the housing and the protector means.

10. Protection apparatus as defined in claim 9, including means defining an annular inlet space surrounding the chamber of the protector means, said annular inlet space having an inlet for external fluid and an outlet communicating with said chamber.

11. Protection apparatus as defined in claim 8, wherein the protector means is located between the housing and the cylinder.

12. Protection apparatus as defined in claim 1, including a bulkhead member at the head-end of the cylinder and mounting means for the piston biasing means connected to the bulkhead member.

13. Protection apparatus as defined in claim 1, wherein the piston biasing means comprises spring means for biasing the piston toward said head-end with a substantially constant force throughout the stroke of the piston.

14. Protection apparatus as defined in claim 12, wherein the piston biasing means includes at least one constant-force spring element coiled on a spool which is journaled to said mounting means, one end of said spring element being connected to the piston, whereby the bias of the spring element tends to coil the element onto the spool and move the piston toward the head-end of the cylinder.

15. Protection apparatus as defined in claim 12, wherein the piston biasing means includes at least one constant-force spring element connected between a pair of spools which are journaled to said mounting means, one of said spools carrying a reel and cable means, the cable means being connected to the piston, whereby the bias of the spring element tends to rotate said one spool in a direction reeling in the cable means and moving the piston toward the head-end of the cylinder.

16. Protection apparatus for preventing the ingress of external fluid into a submergible equipment housing containing protecting liquid, comprising a cylinder for containing further protecting liquid, the cylinder having a head-end with means for providing communication with said housing, a piston in said cylinder, and means for biasing said piston toward said head-end, whereby the protecting liquid in said housing may be maintained under positive pressure relative to that of said external fluid, the apparatus further comprising means responsive to the position of the piston in said cylinder for generating a signal to permit remote monitoring of the condition of the apparatus.

17. Protection apparatus as defined in claim 16, wherein the signal generating means is adapted to generate said signal responsive to the piston attaining a terminal position adjacent the head-end of the cylinder.

18. Protection apparatus as defined in claim 17, wherein the signal generating means includes switch means within said cylinder adjacent the head-end thereof, circuit means associated with the switch means for generating an electric signal upon actuation of the switch means, and switch actuating means carried by the piston.

* * * * *